(12) United States Patent
Chapuis et al.

(10) Patent No.: US 7,239,115 B2
(45) Date of Patent: *Jul. 3, 2007

(54) DIGITAL PULSE WIDTH MODULATION CONTROLLER WITH PRESET FILTER COEFFICIENTS

(75) Inventors: Alain Chapuis, Morgan Hill, CA (US); Dennis R. Roark, Agoura, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/099,391

(22) Filed: Apr. 4, 2005

(65) Prior Publication Data

US 2006/0220625 A1    Oct. 5, 2006

(51) Int. Cl.
*G05F 1/40*    (2006.01)

(52) U.S. Cl. .................................... 323/282

(58) Field of Classification Search ................ 323/222, 323/225, 282, 283, 284, 351
See application file for complete search history.

(56) References Cited

U.S. PATENT DOCUMENTS

| 429,581 A | 6/1890 | Tan |
| 3,660,672 A | 5/1972 | Berger et al. |

(Continued)

FOREIGN PATENT DOCUMENTS

| EP | 0315366 | 5/1989 |

(Continued)

OTHER PUBLICATIONS

33702 Microprocessor Power Supply (3.0A) Analog Products MC33702 Fact Sheet; Motorola/Digital dna/ Power Management Switching; pp. 1-4.

(Continued)

*Primary Examiner*—Adolf Berhane

(74) *Attorney, Agent, or Firm*—O'Melveny & Myers LLP

(57) ABSTRACT

A switched mode voltage regulator includes a digital control system having a digital filter with a plurality of preset filter coefficients that can be selectively loaded into the digital filter to achieve different operating characteristics. The voltage regulator comprises at least one power switch adapted to convey power between respective input and output terminals of the voltage regulator, and a digital controller adapted to control operation of the at least one power switch responsive to an output measurement of the voltage regulator. The digital controller comprises an analog-to-digital converter providing a digital error signal representing a difference between the output measurement and a reference value, a digital filter having a transfer function defined by plural filter coefficients, a digital pulse width modulator providing a control signal to the at least one power switch, the control signal having a pulse width corresponding to the digital control output, and a memory containing a plurality of pre-defined coefficient sets. The digital filter is adapted to load a selected one of the pre-defined coefficient sets into the plural filter coefficients.

16 Claims, 3 Drawing Sheets

U.S. PATENT DOCUMENTS

| | | |
|---|---|---|
| 4,194,147 A | 3/1980 | Payne et al. |
| 4,204,249 A | 5/1980 | Dye et al. |
| 4,335,445 A | 6/1982 | Nercessian |
| 4,451,773 A | 5/1984 | Papathomas et al. |
| 4,538,073 A | 8/1985 | Freige et al. |
| 4,538,101 A | 8/1985 | Shimpo et al. |
| 4,616,142 A | 10/1986 | Upadhyay et al. |
| 4,622,627 A | 11/1986 | Rodriguez et al. |
| 4,654,769 A | 3/1987 | Middlebrook |
| 4,677,566 A | 6/1987 | Whittaker et al. |
| 4,940,930 A | 7/1990 | Detweiler |
| 5,004,972 A | 4/1991 | Roth |
| 5,053,920 A | 10/1991 | Staffiere et al. |
| 5,073,848 A | 12/1991 | Steigerwald et al. |
| 5,079,498 A | 1/1992 | Cleasby et al. |
| 5,117,430 A | 5/1992 | Berglund |
| 5,229,699 A | 7/1993 | Chu et al. |
| 5,272,614 A | 12/1993 | Brunk et al. |
| 5,349,523 A | 9/1994 | Inou et al. |
| 5,377,090 A | 12/1994 | Steigerwald |
| 5,481,140 A | 1/1996 | Maruyama et al. |
| 5,532,577 A | 7/1996 | Doluca |
| 5,627,460 A | 5/1997 | Bazinet et al. |
| 5,631,550 A | 5/1997 | Castro et al. |
| 5,646,509 A | 7/1997 | Berglund et al. |
| 5,675,480 A | 10/1997 | Stanford |
| 5,727,208 A | 3/1998 | Brown |
| 5,752,047 A | 5/1998 | Darty et al. |
| 5,815,018 A | 9/1998 | Soborski |
| 5,847,950 A | 12/1998 | Bhagwat |
| 5,870,296 A | 2/1999 | Schaffer |
| 5,872,984 A | 2/1999 | Berglund et al. |
| 5,874,912 A | 2/1999 | Hasegawa |
| 5,883,797 A | 3/1999 | Amaro et al. |
| 5,889,392 A | 3/1999 | Moore et al. |
| 5,892,933 A | 4/1999 | Voltz |
| 5,905,370 A | 5/1999 | Bryson |
| 5,917,719 A | 6/1999 | Hoffman et al. |
| 5,929,618 A | 7/1999 | Boylan et al. |
| 5,929,620 A | 7/1999 | Dobkin et al. |
| 5,935,252 A | 8/1999 | Berglund et al. |
| 5,943,227 A | 8/1999 | Bryson et al. |
| 5,946,495 A | 8/1999 | Scholhamer et al. |
| 5,990,669 A | 11/1999 | Brown |
| 5,994,885 A | 11/1999 | Wilcox et al. |
| 6,021,059 A | 2/2000 | Kennedy |
| 6,055,163 A | 4/2000 | Wagner et al. |
| 6,057,607 A | 5/2000 | Rader, III et al. |
| 6,079,026 A | 6/2000 | Berglund et al. |
| 6,100,676 A | 8/2000 | Burstein et al. |
| 6,115,441 A | 9/2000 | Douglass et al. |
| 6,121,760 A | 9/2000 | Marshall et al. |
| 6,150,803 A | 11/2000 | Varga |
| 6,157,093 A | 12/2000 | Giannopoulos et al. |
| 6,157,182 A | 12/2000 | Tanaka et al. |
| 6,163,143 A | 12/2000 | Shimamori |
| 6,163,178 A | 12/2000 | Stark et al. |
| 6,177,787 B1 | 1/2001 | Hobrecht |
| 6,181,029 B1 | 1/2001 | Berglund et al. |
| 6,191,566 B1 | 2/2001 | Petricek et al. |
| 6,194,883 B1 | 2/2001 | Shimamori |
| 6,198,261 B1 | 3/2001 | Schultz et al. |
| 6,199,130 B1 | 3/2001 | Berglund et al. |
| 6,208,127 B1 | 3/2001 | Doluca |
| 6,211,579 B1 | 4/2001 | Blair |
| 6,249,111 B1 | 6/2001 | Nguyen |
| 6,262,900 B1 | 7/2001 | Suntio |
| 6,291,975 B1 | 9/2001 | Snodgrass |
| 6,304,066 B1 | 10/2001 | Wilcox et al. |
| 6,304,823 B1 | 10/2001 | Smit et al. |
| 6,320,768 B1 | 11/2001 | Pham et al. |
| 6,351,108 B1 | 2/2002 | Burnstein et al. |
| 6,355,990 B1 | 3/2002 | Mitchell |
| 6,385,024 B1 | 5/2002 | Olson |
| 6,392,577 B1 | 5/2002 | Swanson et al. |
| 6,396,169 B1 | 5/2002 | Voegli et al. |
| 6,396,250 B1 | 5/2002 | Bridge |
| 6,400,127 B1 | 6/2002 | Giannopoulos |
| 6,411,072 B1 | 6/2002 | Feldman |
| 6,421,259 B1 | 7/2002 | Brooks et al. |
| 6,429,630 B2 | 8/2002 | Pohlman et al. |
| 6,448,745 B1 | 9/2002 | Killat |
| 6,456,044 B1 | 9/2002 | Darmawaskita |
| 6,465,909 B1 | 10/2002 | Soo et al. |
| 6,465,993 B1 | 10/2002 | Clarkin et al. |
| 6,469,478 B1 | 10/2002 | Curtin |
| 6,469,484 B2 | 10/2002 | L'Hermite et al. |
| 6,476,589 B2 | 11/2002 | Umminger et al. |
| 6,556,158 B2 | 4/2003 | Steensgaard-Madsen |
| 6,563,294 B2 | 5/2003 | Duffy et al. |
| 6,583,608 B2 | 6/2003 | Zafarana et al. |
| 6,590,369 B2 | 7/2003 | Burstein et al. |
| 6,608,402 B2 | 8/2003 | Soo et al. |
| 6,621,259 B2 | 9/2003 | Jones et al. |
| 6,683,494 B2 | 1/2004 | Stanley |
| 6,686,831 B2 | 2/2004 | Cook |
| 6,693,811 B1 | 2/2004 | Bowman et al. |
| 6,717,389 B1 | 4/2004 | Johnson |
| 6,731,023 B2 | 5/2004 | Rothleitner et al. |
| 6,744,243 B2 | 6/2004 | Daniels et al. |
| 6,771,052 B2 | 8/2004 | Ostojic |
| 6,788,033 B2 | 9/2004 | Vinciarelli |
| 6,788,035 B2 | 9/2004 | Bassett et al. |
| 6,791,302 B2 | 9/2004 | Tang et al. |
| 6,791,368 B2 | 9/2004 | Tzeng et al. |
| 6,795,009 B2 | 9/2004 | Duffy et al. |
| 6,801,027 B2 | 10/2004 | Hann et al. |
| 6,807,070 B2 | 10/2004 | Ribarich |
| 6,816,758 B2 | 11/2004 | Maxwell, Jr. et al. |
| 6,819,537 B2 | 11/2004 | Pohlman et al. |
| 6,828,765 B1 | 12/2004 | Schultz et al. |
| 6,829,547 B2 | 12/2004 | Law et al. |
| 6,833,691 B2 * | 12/2004 | Chapuis ................ 323/283 |
| 6,850,046 B2 * | 2/2005 | Chapuis ................ 323/282 |
| 6,850,426 B2 | 2/2005 | Kojori et al. |
| 6,853,169 B2 | 2/2005 | Burstein et al. |
| 6,888,339 B1 | 5/2005 | Travaglini et al. |
| 6,903,949 B2 | 6/2005 | Ribarich |
| 6,911,808 B1 | 6/2005 | Shimamori |
| 6,915,440 B2 | 7/2005 | Berglund et al. |
| 6,917,186 B2 | 7/2005 | Klippel et al. |
| 6,928,560 B1 | 8/2005 | Fell, III et al. |
| 6,933,709 B2 * | 8/2005 | Chapuis ................ 323/282 |
| 6,933,711 B2 | 8/2005 | Sutardja et al. |
| 6,947,273 B2 | 9/2005 | Bassett et al. |
| 6,963,190 B2 * | 11/2005 | Asanuma et al. .......... 323/283 |
| 6,965,220 B2 | 11/2005 | Kernahan et al. |
| 6,965,502 B2 | 11/2005 | Duffy et al. |
| 6,975,494 B2 | 12/2005 | Tang et al. |
| 6,977,492 B2 | 12/2005 | Sutardja et al. |
| 7,007,176 B2 | 2/2006 | Goodfellow et al. |
| 7,023,672 B2 | 4/2006 | Goodfellow et al. |
| 2001/0033152 A1 | 10/2001 | Pohlman et al. |
| 2001/0052862 A1 | 12/2001 | Roelofs |
| 2002/0070718 A1 | 6/2002 | Rose |
| 2002/0073347 A1 | 6/2002 | Zafarana et al. |
| 2002/0105227 A1 | 8/2002 | Nerone et al. |
| 2003/0122429 A1 | 7/2003 | Zhang et al. |
| 2003/0142513 A1 | 7/2003 | Vinciarelli |
| 2003/0201761 A1 | 10/2003 | Harris |
| 2004/0027101 A1 | 2/2004 | Vinciarelli |
| 2004/0090219 A1 | 5/2004 | Chapuis |
| 2004/0093533 A1 | 5/2004 | Chapuis et al. |
| 2004/0123164 A1 | 6/2004 | Chapuis et al. |

| | | |
|---|---|---|
| 2004/0123167 A1 | 6/2004 | Chapuis |
| 2004/0135560 A1 | 7/2004 | Kernahan et al. |
| 2004/0155640 A1 | 8/2004 | Sutardja et al. |
| 2004/0174147 A1 | 9/2004 | Vinciarelli |
| 2004/0178780 A1 | 9/2004 | Chapuis |
| 2004/0189271 A1 | 9/2004 | Hansson et al. |
| 2004/0225811 A1 | 11/2004 | Fosler |
| 2004/0246754 A1 | 12/2004 | Chapuis |
| 2005/0093594 A1 | 5/2005 | Kim et al. |
| 2006/0022656 A1 | 2/2006 | Leung et al. |

FOREIGN PATENT DOCUMENTS

| | | |
|---|---|---|
| EP | 0660487 | 6/1995 |
| EP | 0875994 | 11/1998 |
| EP | 0997825 | 5/2000 |
| RU | 1814177 | 5/1993 |
| WO | WO93/19415 | 9/1993 |
| WO | WO02/31943 | 4/2002 |
| WO | WO02/31951 | 4/2002 |
| WO | WO02/50690 | 6/2002 |

OTHER PUBLICATIONS

"Motorola Switch Mode Power Supply With Multiple Linear Regulators And High Speed CAN Transceiver" Motorola, Inc. 2002; digital dna; Analog Marketing; Rev. 2.5, Nov. 2002; 33394; Multi-Output Power Supply Semiconductor Technical Data.
"Power Management Solutions For Networking Applications"; Presented by Luc Darmon Smart Networks Developer Forum 2003—Jun. 4-6 Euro-Disney Paris, France; Motorola digital dna; www.motorola.com/sndf; pp. 1-26.
"Preliminary Information 1.5 A Switch-Mode Power Supply With Linear Regulator" 33701; Motorola Semiconductor Technical Data; Analog Marketing MC33701/D Rev. 1.0, May 2003; Motorola digital dna; pp. 1-24.
"The I2C-Bus Specification" Version 2.1,Jan. 2000; Document Order No. 9398 393 40011, pp. 1-46.
"System Management Bus Specification" Smart Battery System Specifications, Revision 1.1, Dec. 11, 1998; Copyright 1996, 1997, 1998, Benchmarq Microelectronics Inc., Duracell Inc., Energizer power Systems, Intel Corporation, Linear Technology Corporation, Maxim Integrated Products, Mitsubishi Electric Corporation, National Semiconductor Corporation, Toshiba Battery Co., Varta Batterie AG, All rights reserved, 39 pages.
"KEKB Power Supply Interface Controller Module" by A. Akiyama, T. Nakamura, M. Yoshida, T. Kubo, N. Yamamoto and T. Katoh. KEK, High Energy Accelerator Research Organization, 1-1 Ohio, Tsukuba 305, Japan; International Conference on Accelerator and Large Experimental Physics and Control Systems, 1997, Beijing, China, 4 pages.
"Magnet Power Supply Control System in KEKB Accelerators" by T.T. Nakamura, A. Akiyama, T. Katoh, Ta. Kubo, N. Yamamoto, M. Yoshida. KEK, Tsukuba, Japan International Conference on Accelerator and Large Experimental Physics Control Systems, 1999, Trieste, Italy, pp. 406-408.
"Electronics Products" by Paul Birman and Sarkis Nercessian, Kepco, Inc. Flushing NY vol. 37, No. 10, Electronic Products, Mar. 1995; The Engineer's Magazine of Product Technology; Power Supply Special; DSO Samples Single Shots at 10 Gsamples/s Speech Recognition On A Single Chip LCD Has Flat-Panel Benefits at CRT Cost Product Update: High-Performance OP AMPS; A Hearst Business Publication; pp. 1, 5, 33-34.
"Distributed Intelligence and Modular Architecture for Next Generation DC Power System" by Louis Duguay and Pierre Got Astec Advanced Power Systems, Quebec, CANADA; 6 pgs.
"Digitally-Controlled SMPS Extends Power System Capabilities" by Ron Vinsant, John DiFiore, and Richard Clarke PCIM, Jun. 1994, pp. 30-37.
"Operating and Service Manual", SBC488A Magna-Power Electronics, Inc., Dec. 19, 2002, 58 pgs.
"Operating and Service Manual". SQ Series, DC Power Supplies Magna-Power Electronics, Inc., Dec. 16, 2002, 48 pgs.

"Uniform Languange for Accessing Power Plants—Human-Machine Language", ANSI T1.317-1993 American National Standards Institute, Dec. 14, 1993, 55 pages.
"An Intelligent, Fault Tolerant, High Power, Distributed Power System for Massively Parellel Processing Computers" by J. Burns, J. Riel and T. DiBene IEEE, May 1994, 0-7803-1456-5/94, pp. 795-800.
"BE510 / BE510S Modules"—Bipolar DC Source from 100mV to 20V and from 100nA to 4A Innovative Test Systems; BE510 Version II, Issue 9, Nov. 12, 2000, 3 pgs.
"BE52x Modules"—Multi-range bipolar Dc sources from 30V to 500V, 90W Innovative Test Systems; BE52x Version A, Issue 9, Aug. 3, 2001, 3 pages.
"PCX-150A 150 Amp Pulsed Current Source Operation Manual", Version 3.0 Directed Energy, Inc., 2001, Document No. 9100-0212 R4, 31 pages.
"New Applications Demand Programmable Power Supplies/Sources" by Paul O'Shea http://www.evaluationengineering.com/archive/articles/0997powr.htm, Nelson Publishing, Inc., 1997, 8 pages.
"Market Trends Toward Enhanced Control of Electronic Power Systems" by F.M. Miles, R.K. Danak, T.G. Wilson and G.G. Suranyi IEEE, 1993, 0-7803-0982-0/93, pp. 92-98.
"R Option, S Option DC Power Supplies", IEEE 488.2/RS-232 Programming Manual Power Ten, Document No. M550013-01 Rev C, Jun. 25, 2002, 56 pages.
"A Digitally Controlled Zero-Voltage-Switched Fullbridge Converter" by Karl-Heinz Rinne, Klaus Theml, Joseph Duigan and Oliver McCarthy Power Conversion, Jun. 1994 Proceedings, pp. 317-324.
"Volume 1: Syntax and Style" Standard Commands for Programmable Instruments (SCPI) Consortium, May 1997, Version 1997.0, 68 pages.
"Integrate Internet Solutions Into Your Energy Management Network" by Johan Sarkinen and Ola Lundin Jun. 1998, 7 pages.
"Automating the Design of a Generic Modular Power System for the Global Market" by George Pedersen, Steve Briggs, and Paul Massey Advance Power Raynham Road, Bishops Stortford, Herts.; CM23 5PF UK.
"An Operation and Maintenance Process Model for Energy Management" by Ola Lundin Ericsson Components AB, Energy Systems Division, S-164 81 KISTA—Stockholm, Sweden: 7 pages.
"Intelligent Platform Management Interface Specification v1.5" Intel, Hewlett-Packard, NEC, Dell, Document Revision 1.1, Feb. 20, 2002, 459 pages.
"Volume 2: Command Reference" SCPi Consortium, May 1997, Version 1997.0, 506 pages.
"Volume 4: Instrument Classes" SCPI Consortium, May 1997, Version 1997.0, 58 pages.
"Volume 1: Syntax and Style" SCPI Consortium, May 1999, Version 1999.0, 67 pages.
"Volume 3: Data Interchange Format" SCPI Consortium, May 1997, Version 1997.0, 73 pages.
"Volume 3: Data Interchange Format" SCPI Consortium, May 1999, Version 1999.0, 72 pages.
"Volume 4: Instrument Classes" SCPI Consortium, May 1999, Version 1999.0, 115 pages.
"Service Guide for Agilent 6610xA Power Modules" Agilent Technolgies, Agilent Part No. 5959-3364, Dec. 2002, 101 pages.
"DHP Series DC Power Supplies", IEEE 488.2/RS-232 Options Programming Manual Sorensen, Division of Elgar Electronics Corporation, Document No. M550005-01 Rev B, Jul. 29, 2002, 32 pages.
"Distributed Power Hot Swap Controller" SMH4804 Summit Microelectronics, Inc., 2050 2.3, Mar. 19, 2001, 32 pages.
"Programmer Manual", PS2520G & PS2521G Programmable Power Supplies Tektronix, 070-9197-00, 1995, 70 pages.
"User Manual", PS2520, PS2520G, PS2521 & PS2521G Programmable Power Supplies Tektronix, 070-9196-00, 1995, 56 pages.
"A Power LAN for Telecommunication Power Supply Equipment" by Nicholas Vun C.H., Lau C.T. and Lee B.S. IEEE TENCON '93 Beijing, pp. 24-27.

"VXI Bus Programmable DC Power Supplies" Advanced Power Designs, Inc., Irvine, CA; 4 pages.

"Operating Manual for Internal RS-232 Interface for XT 60 Watt and HPD 300 Watt Series Programmable DC Power Supplies" Xantrex Technology, Inc., 59 pages.

"Auto Sequence Programming Examples for GPIB-M" Xantrex Technology, Inc., Nov. 27, 2002, 1.0a, 4 pages.

"SCPI Programming Examples for GPIB-M" Xantrex Technology, Inc., Nov. 26, 2002, 1.0, 3 pages.

"Implementing a Nationwide Energy Management System" by Stig Sjöberg, Tommy Hedberg, Lars Selberg and Rober Wikström.

"IEEE Standard Codes, Formats, Protocols, and Common Commands for User with IEEE Std 488.1-1987, IEEE Standard Digital Interface for Programmable Instrumentation", IEEE Std 488.2-1992 IEEE, Jun. 18, 1992, ISBN 1-55937-238-9, 254 pages.

"Agilent E3640A-E3649A Programmable dc Power Supplies" Data Sheet Agilent Technologies, 4 pages.

"Agilent E364xA Single Output DC Power Supplies" User's Guide Agilent Technologies, Part No. E3640-90001, Jan. 2000, 207 pages.

"Optimizing Power Product Usage to Speed Design Validation Testing" Application Note 1434 Agilent Technologies, Nov. 22, 2002, 16 pages.

"Volume 2: Command Reference" SCPI Consortium, May 1999, Version 1999.0, 565 pages.

"Why have Monitoring?" by P. Shawyer, P. Hobbs and A. McLeod Texcel Technology PLC, United Kingdom.

"IMPI Intelligent Platform Management Bus Communications Protocol Specification v1.0" Intel, Hewlett-Packard, NEC, Dell, Document Revision 1.0, Nov. 15, 1999, 39 pages.

"Operating and Service Manual", MQ Series DC Power Supplies Magna-Power Electronics, Inc., Dec. 19, 2002, 48 pages.

"User's Guide" Series 661xxA MPS Power Modules & Model 66001A MPS Keyboard Agilent Technologies, Agilent Part No. 5959-3386, Apr. 2000, 53 pages.

"Programming Guide" Series 661xxA MPS Power Modules Agilent Technologies, Agilent Part No. 5959-3362, Sep. 1997, 114 pages.

"Accelerator-Control-System Interface for Intelligent Power Supplies" by S. Cohen Los Alamos National Laboratory, pp. 183-186.

"Testing Intelligent Power Supplies for the Los Alamos National Laboratory Accelerator Complex" by J.C. Sturrock, S. COhen, B.L. Weintraub, D.J. Hayden and S.F. Archuletta Los Alamos National Laboratory, pp. 217-219.

"Intelligent Power Supply Controller" by R.S. Rumrill and D.J. Reinagel IEEE, Aug. 1991, 0-7803-0135-8/91, PAC 1991, pp. 1537-1539.

"Magnet Power Supply as a Network Object" by S. Cohen and R. Stuewe IEEE, Aug. 1991, 0-7803-0135-8/91, PAC 1991, pp. 929-931.

"Non-Impact Printer Power and Motor Control System on a Chip" by James Masson and Steven Barrow IEEE, Apr. 1995, IEEE Catalogue No. 95TH8025, 0-7803-2423-4/95, pp. 98-103.

"Power Distribution Systems for Future Homes" by Po-Wa Lee, Yim-Shu Lee and Bo-Tao Lin IEEE, Aug. 1999, 0-7803-5769-88/99, pp. 1140-1146.

"Installation Guide" MPS Mainframe Model 66000A Agilent Technologies, Agilent Part No. 66000-90001, Apr. 2000, 26 pages.

"Power System Controller in an Intelligent Telecom Rectifier Plant" by Ueli Roth IEEE, Aug. 1992, 0-7803-0779-8/92, pp. 476-483.

"The Continuing Evolution of Intelligence for Telecommunications Power Plants" by Jimmy Godby IEEE, Apr. 1996, 0-7803-3507-4/96, pp. 70-75.

"Digitally Controlled Power Systems: How Much Intelligence is Needed and Where it Should be" by Tom Lock RELTEC Corporation, 5 pages.

"Controlling and Alarming DC Power Plants via the INTERNET" by Anthony P. Cosentino, Michael C. Sullivan, Richard V. Baxterm Jr. and Jon Loeck Power Conversion Productsm LLC and Pensar Corporation, 6 pages.

"Defendant's Artesyn Technologies, Inc.'s Preliminary Invalidity Contentions"—(Power-One, Inc. vs. Artesyn Technologies, Inc. et al.) Civil Action No. 2-05-CV-463 (LED), United States District Court for the Eastern District of Texas; Apr. 26, 2006.

"Quantization Resolution and Limit Cycling in Digitally Controlled PWM Converters" by Angel V. Peterchev and A.V. Sanders Electrical Engineering and Computer Science; UC Berkley; Power Electronics Specialists Conference, 2001.PESC, vol. 2, Jun. 17-21, 2001, pp. 465-471, XP00274573.

"Synchronization of Multiple Voltage Regulators Outputs", By M.W. Mueller et al. IBM Technical Disclosure Bulletin, Jun. 1999; (2 pages).

"Power System Controller in an Intelligent Telecom Rectifier Plant," by U. Roth, INTELLEC 1992, pp. 476-483.

Integrity-Oue: Installation, Operation and Maintenance Manual Power-One, Inc., 1999-2003 Version 1.2 (P025374-P025559).

Data Sheet, Integrity-One Power System—Rack System Power-One, Inc. (P025580-P025583).

Data Sheet, "PCS Controller" Power-One, Inc. (P025584-P025585).

Data Sheet, "PMP 25 Rectifier Module" Power-One, Inc. (P025602-P025603).

"Presenting DALI" AG DALI, 2003, pp. 1-17.

"DALI Manual" DALI AG, Digital Addressable Lighting Interface Activity Group, ZVEI-Division Luminaries, 2001,pp. 1-62.

"Microchip PIC16C781/782 Data Sheet, 8-bit CMOS Microcontrollers with A/D, D/A, OPAMP, Comparators and PSMC" Microchip Technology Inc., 2001, pp. 1-184.

"Microchip AN811, The RS-232/DALI Bridge Interface" Microchip Technology Inc., 2002, DS00811A, pp. 1-8.

"Microship AN809, Digitally Addressable DALI Dimming Ballast" Microchip Technology Inc., 2002, DS00809B, pp. 1-18.

"The Digital Addressable Lighting Interface (DALI): An Emerging Energy-Conserving Lighting Solution" by Ronat, Odile International Rectifier, Apr. 9, 2002, TP4/9/2002, pp. 1-6.

"Microchip AN703, Using the MCP320X 12-Bit Serial A/D Converter with Microchip PICmicro® Devices" Microchip Technologies Inc., 2002, DS00703A, pp. 1-25.

"System Management Bus (SMBus) Specification" Version 2.0 Duracell, Inc., Energizer Power Systems, Inc., Fujitsu, Ltd., Intel Corporation, Linear Technology, Inc., Maxim Integrated Products, Mitsubishi Electric Semiconductor Company, PowerSmart, Inc., Toshiba Battery Co. Ltd., Unitrode Corporation, USAR Systems, Inc., Aug. 3, 2000, pp. 1-59.

"Fieldbus System Engineering Guidelines" Fieldbus Foundation, 2003-2004, pp. 1-94.

Technical Overview, FOUNDATION™ fieldbus, Freedom Fieldbus Foundation, 2003, FD-043 Rev 3.0, pp. 1-37.

"Silicon Labs Preliminary Invalidity Contentions" Civil Action No. 02-05-CV-463 (LED)—May 26, 2006 (U.S. District Court Eastern District of Texas).

* cited by examiner

DIGITAL PULSE WIDTH MODULATION CONTROLLER WITH PRESET FILTER COEFFICIENTS

BACKGROUND OF THE INVENTION

1. Field of the Invention

The present invention relates to voltage regulator circuits, and more particularly to digital pulse width modulation controller having a plurality of preset filter coefficients in order to accommodate various $V_{IN}/V_{OUT}$ and load configurations.

2. Description of Related Art

Switched mode voltage regulators are known in the art to convert an available direct current (DC) level voltage to another DC level voltage. A switched mode voltage regulator provides a regulated DC output voltage to a load by selectively storing energy in an output inductor coupled to the load by switching the flow of current into the output inductor. A buck converter is one particular type of switched mode voltage regulator that includes two power switches that are typically provided by MOSFET transistors. A filter capacitor coupled in parallel with the load reduces ripple of the output current. A pulse width modulation (PWM) control circuit is used to control the gating of the power switches in an alternating manner to control the flow of current in the output inductor. The PWM control circuit uses feedback signals reflecting the output voltage and/or current level to adjust the duty cycle applied to the power switches in response to changing load conditions.

Conventional PWM control circuits are constructed using analog circuit components, such as operational amplifiers, and other discrete components. An error amplifier produces a voltage error signal corresponding to the difference between the feedback signals and a voltage reference. The voltage error signal controls a PWM modulator that determines the duty cycle applied to the power switches. Various resistors and capacitors are required to shape the transfer function of the error amplifier and thereby maintain stability of the feedback loop. Several factors can affect the feedback loop gain (e.g., changes in the input voltage, additional output capacitance, changing from a resistive to a constant current load, etc.) and need to be considered when selecting the resistors and capacitors. For this reason, the resistors and capacitors are typically not integrated into the PWM control circuitry, but rather are maintained as external components that can be selected to achieve a particular error amplifier transfer function.

A drawback of the conventional PWM control circuit is that there are quite a few discrete components that must be selected very carefully. High quality components having tight tolerances must be selected for this purpose. For example, the components must remain stable with changes in temperature in order to avoid loop gain changes and instability. The physical locations of the components is also critical to prevent pick up of noise that can affect the feedback loop. Another drawback with conventional PWM control circuits is that the hardwiring of the resistors and capacitors to the PWM control circuitry renders it very difficult to change the error amplifier transfer function. It would be desirable to have a PWM control circuit that can be operated using several alternative transfer functions to accommodate different operating conditions.

More recently, it is known to use digital circuitry in the PWM control circuit instead of the analog circuit components since digital circuitry takes up less physical space and draws less power. A conventional digital control circuit includes an analog-to-digital converter (ADC) that produces a digital error signal. The digital error signal is provided to a digital controller having a transfer function H(z) and shapes the transfer function H(z) to guarantee stability of the voltage regulator feedback loop with enough phase margin. The digital output of the controller is provided to a digital pulse width modulator (DPWM) that converts the output into a proportional pulse width signal that is used to control the power switches of the voltage regulator. Nevertheless, as with the analog PWM control circuit, the known digital PWM control circuits are only programmed for a single transfer function.

Thus, it would be advantageous to provide a digital pulse width modulation controller having a plurality of preset filter coefficients to accommodate different operating conditions of a switched mode voltage regulator.

SUMMARY OF THE INVENTION

The present invention provides a switched mode voltage regulator having a digital control system. More particularly, the invention provides a digital control system having a digital filter with a plurality of preset filter coefficients that can be selectively loaded into the digital filter to achieve different operating characteristics.

In an embodiment of the invention, the voltage regulator comprises at least one power switch adapted to convey power between respective input and output terminals of the voltage regulator, and a digital controller adapted to control operation of the at least one power switch responsive to an output measurement of the voltage regulator. The digital controller comprises an analog-to-digital converter providing a digital error signal representing a difference between the output measurement and a reference value, a digital filter having a transfer function defined by plural filter coefficients, a digital pulse width modulator providing a control signal to the at least one power switch, the control signal having a pulse width corresponding to the digital control output, and a memory containing a plurality of pre-defined coefficient sets. The digital filter is adapted to load a selected one of the pre-defined coefficient sets into the plural filter coefficients.

A more complete understanding of the system and method for digitally controlling a switched mode voltage regulator will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a digital pulse width modulation controller having a plurality of preset filter coefficients to accommodate different operating conditions of a switched mode voltage regulator. In the detailed description that follows, like element numerals are used to describe like elements illustrated in one or more figures.

Figure 1:
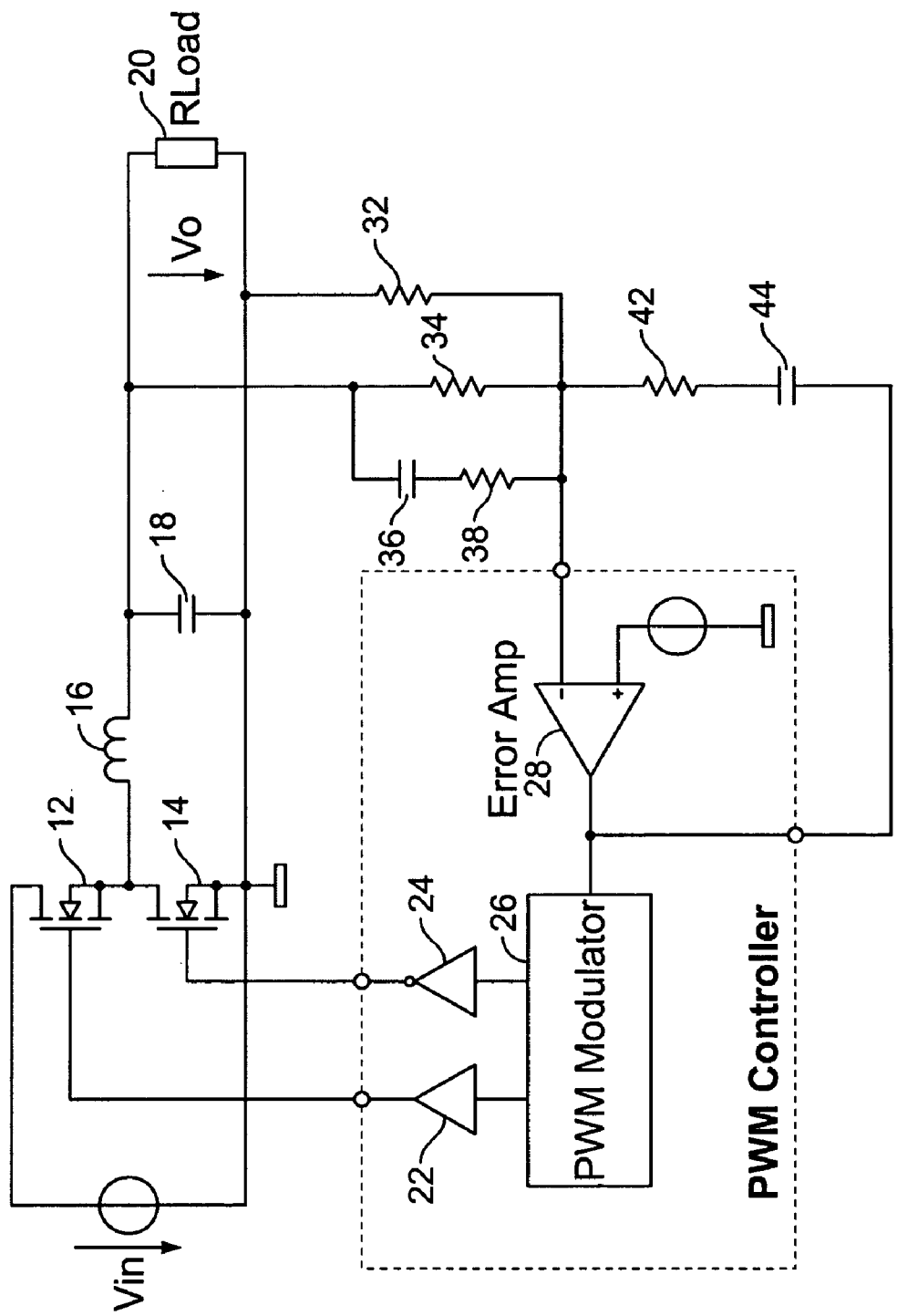
FIG. 1 depicts a conventional switched mode voltage regulator having an analog PWM control circuit.

FIG. 1 depicts a conventional switched mode voltage regulator having an analog control circuit. The voltage regulator comprises a buck converter topology to convert an input DC voltage $V_{in}$ to an output DC voltage $V_o$ applied to a resistive load 20 ($R_{load}$). The voltage regulator includes a pair of power switches 12, 14 provided by MOSFET devices. The drain terminal of the high side power switch 12 is coupled to the input voltage $V_{in}$, the source terminal of the low side power switch 14 is connected to ground, and the source terminal of power switch 12 and the drain terminal of power switch 14 are coupled together to define a phase node. An output inductor 16 is coupled in series between the phase node and the terminal providing the output voltage $V_o$, and a capacitor 18 is coupled in parallel with the resistive load $R_{load}$. The opening and closing of the power switches 12, 14 provides an intermediate voltage having a generally rectangular waveform at the phase node, and the filter formed by the output inductor 16 and capacitor 18 converts the rectangular waveform into a substantially DC output voltage $V_o$.

A pulse width modulation (PWM) controller drives the gate terminals of the power switches 12, 14 responsive to feedback signals received from the voltage regulator output. Specifically, the PWM controller includes drivers 22, 24, PWM modulator 26, and error amplifier 28. Error amplifier 28 receives at an inverting terminal a feedback sense voltage determined by a voltage divider circuit defined by resistors 34 and 32, which are coupled in parallel with the resistive load $R_{load}$. The non-inverting terminal of the error amplifier 28 is coupled to a voltage reference. The error amplifier 28 produces a voltage error signal corresponding to the difference between the feedback sense voltage and the voltage reference. The voltage error signal is provided to the PWM modulator, which generates a modulated periodic signal having a pulse width corresponding to the voltage error signal. The modulated periodic signal is applied to drivers 22, 24, which in turn drive the gate terminals of the power switches 12, 14 so as to regulate the output voltage $V_o$.

Resistor 38 and capacitor 36 are coupled in parallel with resistor 34 to provide a lead compensation to the error amplifier 28. Resistor 42 and capacitor 44 provide a feedback loop between the output and inverting input of the error amplifier 28, which defines the integrator pole and a second lead compensation in the transfer function of the error amplifier. As discussed above, these resistors and capacitors are generally coupled external to the PWM controller chip so that they can be selected for the particular characteristics of the voltage regulator. It is not practical to change the resistors and capacitors, and thereby alter the transfer function of the error amplifier to accommodate changes in the operational conditions of the voltage regulator.

Figure 2:
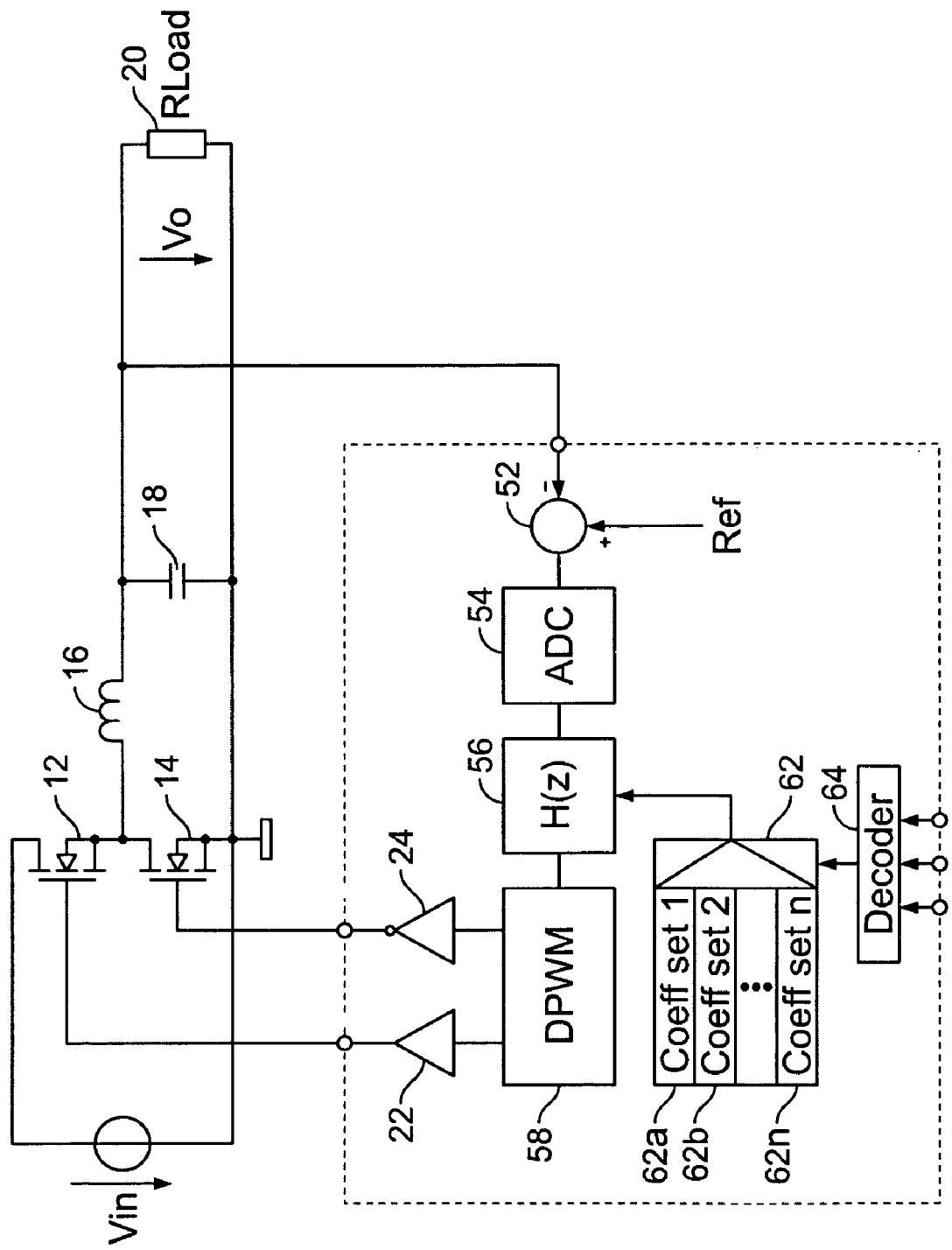
FIG. 2 depicts a switched mode voltage regulator having a digital PWM control circuit in accordance with an embodiment of the invention.

FIG. 2 depicts a switched mode voltage regulator having a digital control circuit in accordance with an embodiment of the invention. Unlike the voltage regulator of FIG. 1, a digital control circuit controls operation of the drivers 22, 24. The digital control circuit receives a feedback signal from the output portion of the voltage regulator. The feedback signal corresponds to the output voltage $V_o$, though it should be appreciated that the feedback signal could alternatively (or additionally) correspond to the output current drawn by the resistive load $R_{load}$. The feedback path may further include a voltage divider (not shown) to reduce the detected output voltage $V_o$ to a representative voltage level. The digital control circuit provides a pulse width modulated waveform having a duty cycle controlled to regulate the output voltage $V_o$ (or output current) at a desired level. Even though the exemplary voltage regulator is illustrated as having a buck converter topology, it should be understood that the use of feedback loop control of the voltage regulator using the digital control circuit is equally applicable to other known voltage regulator topologies, such as boost and buck-boost converters.

More particularly, the digital control circuit includes summer 52, analog-to-digital converter (ADC) 54, digital filter 56, and digital pulse width modulator (DPWM) 58. The summer 52 receives as inputs the inverted feedback signal (i.e., output voltage $V_o$) and a voltage reference (Ref) and provides an analog voltage error signal (Ref-$V_o$). The ADC 54 produces a digital representation of the voltage error signal ($VEd_k$). It should be noted that the ADC 54 and the summer 52 could be reversed in their order. The summer in that case would be a digital circuit. The digital filter 56 has a transfer function H(z) that transforms the voltage error signal $VEd_k$ to a digital output provided to the DPWM 58, which converts the signal into a waveform having a proportional pulse width. As discussed above, the pulse-modulated waveform produced by the DPWM 58 is coupled to the gate terminals of the power switches 12, 14 through respective drivers 22, 24.

The digital filter 56 may further comprise an infinite impulse response (IIR) filter that produces an output $PWM_k$ from previous voltage error inputs $VEd_k$ and previous outputs $PWM_k$ using parallel convolution operations. The digital filter 56 may comprise an implementation of the following transfer function H(z):

$$H(z) = \frac{PWM(z)}{VEd(z)} = \frac{C_0 + C_1 \cdot z^{-1} + C_2 \cdot z^{-2} + \ldots + C_n \cdot z^{-n}}{1 - B_1 \cdot z^{-1} - B_2 \cdot z^{-2} - \ldots - B_n \cdot z^{-n}}$$

in which PWM(z) is the digital filter output, VEd(z) is the error signal, $C_0 \ldots C_3$ are input side coefficients, and $B_1 \ldots B_3$ are output side coefficients. The numerator coefficients ($C_0, C_1, C_2, C_4, \ldots$) and denominator coefficients ($B_1, B_2, B_3, \ldots$) are programme the digital filter to achieve a desired transfer function. The digital filter 56 may be implemented by a digital signal processor or like electronic circuitry having suitable memory containing stored data values that are accessed to supply the numerator and/or denominator coefficients. It should be appreciated that the characteristics of the digital filter 56 are determined by the values of the coefficients. The above transfer function is merely exemplary, and other transfer functions having greater or lesser numbers of coefficients may also be advantageously utilized.

The digital control circuit further comprises a multiplexer 62 containing a plurality of pre-defined coefficient sets 62a–62n. The multiplexer 62 has an output coupled to the digital filter 56. The multiplexer 62 receives control signals from a decoder 64. When activated by the decoder 64, the multiplexer 62 provides a selected one of the stored coefficient sets 62a–62n to the digital filter 56 for programming of the corresponding coefficients of the transfer function. The numerical values contained within the selected coefficient set would then be stored in the corresponding memory locations and then accessed by the digital filter 56 in the course of ordinary operation. The decoder 64 has a multi-bit address input that is responsive to externally provided address signals to generate corresponding control signals for selection of a desired one of the pre-defined coefficient sets 62a–62n.

For example, the address input may be provided by the host system to which the voltage regulator is attached. The host system may provide an address input to select one of the pre-defined coefficient sets during a start-up sequence of the voltage regulator. The same selected coefficient set may then remain loaded into the digital filter through the operational life of the voltage regulator. Alternatively, or in addition, the host system may change the address input during operation of the voltage regulator in response to changing operating conditions.

It should be appreciated that any suitable number of pre-defined coefficient sets 62a–62n can be included in the multiplexer 62, and the coefficient sets may be of any desired length. The decoder 64 would therefore require an address size sufficient to individually select each one of the pre-defined coefficient sets 62a–62n. As shown in FIG. 2, the decoder 64 receives a three-bit address, thereby permitting selection from up to eight different pre-defined coefficient sets, although it should be appreciated that other address sizes may be utilized to select among a greater or lesser number of coefficient sets.

Figure 3:
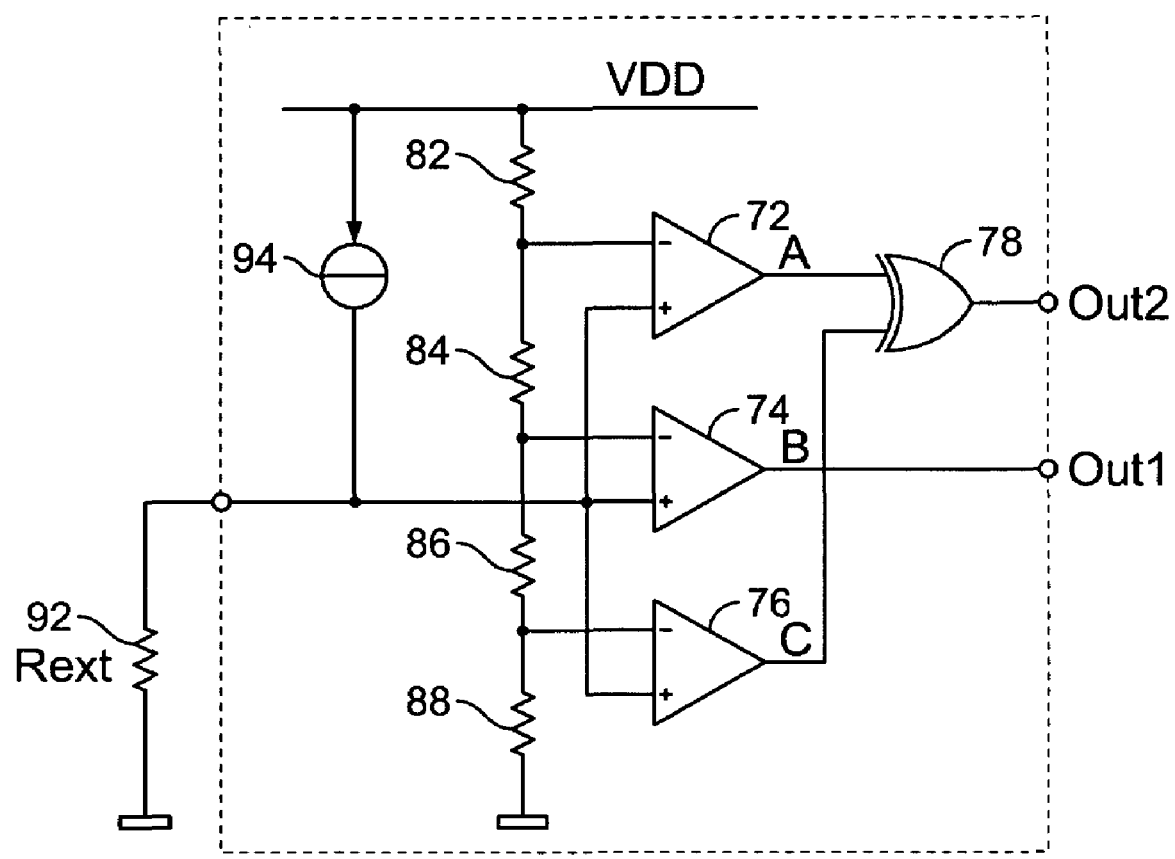
FIG. 3 depicts a multi-level selector device for the digital PWM control circuit in accordance with an alternative embodiment of the invention.

FIG. 3 depicts a multi-level selector device for the digital PWM control circuit in accordance with an alternative embodiment of the invention. The multi-level selector device may be used to provide an address to the decoder 64 shown in FIG. 2. Instead of receiving an external address input, the selector device permits attachment of an external resistor, which causes the generation of a particular address for selection of a desired one of the pre-defined coefficient sets.

More particularly, the selector device includes amplifiers 72, 74, 76, exclusive OR gate (XOR) 78, and resistors 82, 84, 86, 88. A single input pin provides a space for attachment of an external resistor $R_{ext}$ 92. The resistors 82, 84, 86, 88 are connected in series between a voltage source VDD and ground, defining voltage dividers coupled to respective ones of the inverting terminals of the amplifiers 72, 74, 76. The non-inverting terminals of the amplifiers 72, 74, 76 are coupled to the input pin. The second amplifier 74 provides a first bit output (Out1) and the XOR 78 provides a second bit output (Out2). The outputs of the first and third amplifiers 72, 76 are coupled to the inputs of the XOR 78. A current source 94 is provided to the input pin in order to define a voltage across the external resistor $R_{ext}$ 92.

A state table provided below reflects the various states of the selector device. If the input pin is left open and the input voltage rises to VDD, then each of amplifiers 72, 74, 76 produce a positive voltage (data high or 1), the XOR 78 would produce a data low (or 0), and the output address would be 01. If the voltage across the external resistor $R_{ext}$ 92 is a high value, i.e., greater than the voltage defined between resistors 84, 86, but less than the voltage defined between resistors 82, 84, then amplifier 72 produces a negative voltage (data low or 0) and amplifiers 74, 76 produce a positive voltage (data high or 1), the XOR 78 would produce a data high (or 1), and the output address would be 11. If the voltage across the external resistor $R_{ext}$ 92 is a low value, i.e., greater than the voltage defined between resistors 86, 88, but less than the voltage defined between resistors 84, 86, then amplifiers 72, 74 produce a negative voltage (data low or 0) and amplifier 76 produces a positive voltage (data high or 1), the XOR 78 would produce a data high (or 1), and the output address would be 10. Lastly, if the input pin is coupled to ground, then each of amplifiers 72, 74, 76 produce a negative voltage (data low or 0), the XOR 78 would produce a data low (or 0), and the output address would be 00.

Selector State Table

| $R_{ext}$ | Out2 | Out1 |
| --- | --- | --- |
| Open | 0 | 1 |
| High Value | 1 | 1 |
| Low Value | 1 | 0 |
| Short to ground | 0 | 0 |

It is anticipated that the user would select the value of the external resistor $R_{ext}$ 92 at the time that the system is set up. As long as the external configuration doesn't change, there would be no need to change the coefficients. By using an external resistor rather than a multi-bit input address, the number of input pins coupled to the digital control circuit can be reduced, and thereby reduce the corresponding real estate on the semiconductor chip.

Having thus described a preferred embodiment of a digital pulse width modulation controller having a plurality of preset filter coefficients, it should be apparent to those skilled in the art that certain advantages of the system have been achieved. It should also be appreciated that various modifications, adaptations, and alternative embodiments thereof may be made within the scope and spirit of the present invention. The invention is solely defined by the following claims.

What is claimed is:

1. A voltage regulator comprising:
   at least one power switch adapted to convey power between respective input and output terminals of said voltage regulator; and
   a digital controller adapted to control operation of said at least one power switch responsive to an output measurement of said voltage regulator, said digital controller comprising:
   an analog-to-digital converter providing a digital error signal representing a difference between said output measurement and a reference value;
   a digital filter having a transfer function defined by plural filter coefficients;
   a digital pulse width modulator providing a control signal to said at least one power switch, said control signal having a pulse width corresponding to said digital control output; and
   a memory containing a plurality of pre-defined coefficient sets, said digital filter being adapted to load a selected one of said pre-defined coefficient sets into said plural filter coefficients.

2. The voltage regulator of claim 1, wherein said digital controller further comprises a multiplexer operatively coupled to said memory and to said digital filter and adapted to select one of said pre-defined coefficient sets in response to a control signal.

3. The voltage regulator of claim 2, wherein said digital controller further comprises a selector adapted to provide said control signal to said multiplexer in response to an address signal.

4. The voltage regulator of claim 3, wherein said address signal is received from an external host.

5. The voltage regulator of claim 3, wherein said address signal is defined by at least one external resistor.

6. The voltage regulator of claim 1, wherein said digital filter provides the following transfer function H(z):

$$H(z) = \frac{PWM(z)}{VEd(z)} = \frac{C_0 + C_1 \cdot z^{-1} + C_2 \cdot z^{-2} + C_3 \cdot z^{-3}}{1 - B_1 \cdot z^{-1} - B_2 \cdot z^{-2} - B_3 \cdot z^{-3}}$$

wherein PWM(z) is the digital control output, VEd(z) is the error signal, $C_0 \ldots C_3$ are input side coefficients, and $B_1 \ldots B_3$ are output side coefficients.

7. A method of controlling a voltage regulator comprising at least one power switch adapted to convey power between input and output terminals of said voltage regulator, said method comprising:

receiving an output measurement of said voltage regulator;

sampling said output measurement to provide a digital error signal representing a difference between said output measurement and a reference value;

filtering said digital error signal to provide a digital control output based on a transfer function defined by plural filter coefficients;

providing a control signal to said at least one power switch, said control signal having a pulse width corresponding to said digital control output;

storing a plurality of pre-defined coefficient sets; and selectively loading a selected one of said pre-defined coefficient sets into said plural filter coefficients.

8. The method of claim 7, wherein said selectively loading step further comprising selecting said one of said pre-defined coefficient sets in response to an externally provided address signal.

9. The method of claim 7, wherein said selectively loading step further comprising selecting said one of said pre-defined coefficient sets in response to at least one externally coupled resistor.

10. The method of claim 7, wherein said filtering step further comprising filtering said digital error signal using the following transfer function H(z):

$$H(z) = \frac{PWM(z)}{VEd(z)} = \frac{C_0 + C_1 \cdot z^{-1} + C_2 \cdot z^{-2} + C_3 \cdot z^{-3}}{1 - B_1 \cdot z^{-1} - B_2 \cdot z^{-2} - B_3 \cdot z^{-3}}$$

wherein PWM(z) is the digital control output, VEd(z) is the error signal, $C_0 \ldots C_3$ are input side coefficients, and $B_1 \ldots B_3$ are output side coefficients.

11. A voltage regulator comprising:

at least one power switch adapted to convey power between respective input and output terminals of said voltage regulator; and a digital controller adapted to control operation of said at least one power switch responsive to an output measurement of said voltage regulator, said digital controller comprising:

an analog-to-digital converter providing a digital error signal representing a difference between said output measurement and a reference value;

a digital filter having a transfer function defined by plural filter coefficients and means for selecting said plural filter coefficients from among a plurality of pre-defined coefficient sets; and a digital pulse width modulator providing a control signal to said at least one power switch, said control signal having a pulse width corresponding to said digital control output.

12. The voltage regulator of claim 11, wherein said selecting means further comprises a memory containing said plurality of pre-defined coefficient sets and a multiplexer operatively coupled to said memory and to said digital filter and adapted to select one of said pre-defined coefficient sets in response to a control signal.

13. The voltage regulator of claim 12, wherein said digital controller further comprises a selector adapted to provide said control signal to said multiplexer in response to an address signal.

14. The voltage regulator of claim 13, wherein said address signal is received from an external host.

15. The voltage regulator of claim 13, wherein said address signal is defined by at least one external resistor.

16. The voltage regulator of claim 11, wherein said digital filter provides the following transfer function H(z):

$$H(z) = \frac{PWM(z)}{VEd(z)} = \frac{C_0 + C_1 \cdot z^{-1} + C_2 \cdot z^{-2} + C_3 \cdot z^{-3}}{1 - B_1 \cdot z^{-1} - B_2 \cdot z^{-2} - B_3 \cdot z^{-3}}$$

wherein PWM(z) is the digital control output, VEd(z) is the error signal, $C_0 \ldots C_3$ are input side coefficients, and $B_1 \ldots B_3$ are output side coefficients.

* * * * *